Patented Jan. 24, 1939

2,144,781

UNITED STATES PATENT OFFICE 2,144,781

FILTER PAD AND METHOD OF PURIFYING LIQUIDS

George H. Seitz, Bad Kreuznach-on-the-Nahe, Germany

No Drawing. Application October 12, 1937, Serial No. 168,587

7 Claims. (Cl. 210—204)

My invention relates to sheets for filtration purposes and the method of purifying liquids therewith.

This application is a continuation in part of my heretofore allowed application, Serial No. 734,233, filed July 7, 1934, entitled Filter pad and method of purifying liquids.

Many varieties of filters or filter sheets have been in use for various purposes for years, made of textile fibres, asbestos, metal, silex, glass stoneware, etc., or mixtures of certain of these. These have been used for removal of various kinds of solid matter; mineral, vegetable and animal, of varying degrees of more fineness. Filtration is, therefore, a highly developed art with many means and methods but the problem of practical and commercial filtration of certain classes of liquids so that they are free enough from suspended matter to be sterile has, so far as I am aware, never been solved. The general classes of liquids referred to are those which are well gas-charged (i. e. naturally or artificially aerated or carbonated) and also more particularly the class of liquids which are not only gas-charged but are also materially more viscous than water and perhaps also carrying more or less soft and suspended matter. Liquids of the above-mentioned carbonated or otherwise gas-charged character will be called "charged", for brevity, and those which exhibit a viscosity materially greater than that of water will be called "viscous".

Attempts have been made to meet the essential commercial requirements for filtration of such liquids, which are packaged and sold in enormous quantities, but so far without practical success. Because hard stone filters, like unglazed earthenware, can be used for the mere removal of many kinds of bacteria from some liquids, they have been tried for commercial filtration of these charged or charged and viscous liquids, but without success. Their very hardness I believe to have been one of the causes of their practical failure. Specially constructed fibre filters have been used in the sterilization as well as clarification of "still" or uncharged liquids with more or less success, but were unreliable and impractical, short-lived and expensive to operate, when used for charged liquids, and did not lend themselves to sterilization with steam or to regeneration by back-washing. For many years, the firm with which applicant has been associated manufactured pliable filter sheets of that character which were highly successful but which nevertheless were wholly unable to meet the special requirements of the charged liquids and particularly of those which were both charged and also viscous.

After such experimentation in the filter factory and also in the commercial plants manufacturing the kind of liquids above referred to, I have discovered what I believe to be the causes of previous failures and devised a method of making a product (filter) which has been commercially successful.

Contrary to previous expectations and attempts, I believe that a certain degree of pliability or compressibility of the filter is one element of success. I believe that the combination of two kinds of fibre in suitable proportions each having its special electrostatic qualities gives the filter sheets a special and unique adsorption power for germs. Also, that the increasing pressures required as filtration proceeds and the interstices of the filter fill up, help to compress the sheet slightly and aid in preventing the slightest escape of nonsterile matter. Also, when the filtration is completed, the slight flexibility makes possible the release and ejection of this material (as by back-washing) without undue strain and disruption of the filter bed.

Contrary to previous expectations, I have found that, on the other hand, a degree and kind of interlocking action between the fibres is of great importance and that this involves the utilization not only of different but special proportions of different kinds of fibre and more carefully selected fibre than has hitherto been used. I also have discovered that it involves a different length of fibre from that hitherto preferred (generally long fibre or else minute granules) and I prefer to use rather short fibre within well restricted limits. Furthermore, I find that a different orientation of the fibres themselves is required in order to get the best results. Finally, a quite different proportion or ratio of two quite different kinds of fibre is desirable.

Formerly, filter sheets were made entirely of asbestos fibre or entirely of organic fibre or of a mixture of the asbestos fiber and organic fibre in which the former largely predominated. The proportion of mineral matter (say asbestos) was generally much over 60% of the total material and the organic fibre substantially less than 40%. On the contrary, I use a larger proportion of organic fibre, to wit, from 50% and up to about 77% by oven-dry weight blended with from 50% down to 23% of mineral fibre.

Formerly, fibres of widely varying length (the longer the better) were used. On the contrary, I prefer to have practically all of the fibres relatively short and to restrict their length within rather narrow limits. The asbestos fibre should preferably be from about 1.5 to 3.0 mm. long and the organic fibre (say cellulose) should preferably be from about 2½ to 5 mm. long but in addition there should be preferably more than 75% of the weight of each kind of fibre which is above the average of its limiting lengths, to attain the felted coherency, free from adhesives, and adsorptive properties characteristic of my freely felted intermixture.

Formerly, the fibres were merely mixed together in water, flowed upon a screen and then pressed, or sucked free from liquid to produce a more or less web-like structure similar to ordinary paper fibres.

Contrary to these practices, I prefer to subject the selected wet fibres while still flowing, and somewhat suspended by the water, to a vigorous vibrating action, preferably transverse to the direction of the flow of the pulp. This produces a thorough heterogeneous interlocking and felting action which, I believe, is not obtainable, even by the same treatment, with the previous longer and more widely varied lengths of fibre. Also I believe this felting action to be assisted by the proportion of fibres of higher density and greater inertia, poking in between and interlocking the lighter fibres that are moved more readily with the vibration of the water.

Formerly, it has been accepted theory that felted structures should comprise at least a very considerable proportion of fibres having a length much greater than the thickness of the sheet, for the purpose of bonding the shorter fibres. I prefer not to have any substantial proportion of the fibres more than 2½ times the thickness of my sheets which so far have been made only 2-4 mm. thick. I have discovered that, for making my new filter sheets any considerable proportion of such very long fibres is objectionable. I believe this to be due to the lever of cantilever action or the dragging and pulling action of these long fibres which tends to open irregular channels in the felted mass or otherwise disturb its structure during use under varying and particularly under reversed pressure.

I have given my theory with respect to the causes of the novel peculiarities of my filters with the purpose of making as full, clear, and exact an explanation of my invention as possible, but cannot warrant the correctness of these theories or be bound by them because the practical results are too novel and recent to have been fully investigated as yet.

The resulting filter sheets are well integrated by the filtering action, that their size is not limited to about 30 cm. in diameter and they are commercially practical up to 40 or 60 cm. in diameter. Furthermore there is little danger of channelling in use, but these are not the most important differences from former filters. They need not be sterilized before installation, but are internally strong and homogeneous enough to withstand sterilization with direct application of steam pressure 10 to 15 pounds per square inch higher on one side than on the other, or with other agents while the filter is in place. Their internal structure is so intricately felted and coherent that neither the expansion of the steam due to its fall in pressure while passing through the sheet nor the evolution of other gases liberated from charged liquids in process of filtration can even produce disturbance of the fibres sufficient to permit passage of the slightest non-sterile material. These new filters are therefore internally sterilely-rigid, and I call them "coherently felted". Even further, when it is desirable to clean them, these filters can be made sufficiently coherent that, after a day's work, when they become more or less clogged, they can be back-washed with water and again sterilized with steam, if necessary, and may be reused from four to eight or even ten times before the internal structure is sufficiently disturbed and loosened to permit the passage of any non-sterile material.

In making the filter sheets, I may proceed as follows: Asbestos is put in fibre form by picking, grinding, etc. The quality of asbestos used should be carefully selected with a view to its fineness and uniformity of fibre and its adsorptive properties due I believe to electrostatic or polar quality. The length of fibre may be determined either by suitably sizing the lump before picking or by separation of the resulting fibres hereafter or by cutting the shredded fibre to suitable length. The asbestos fibre is then washed to remove the dust and excess of fibres that are too short, or some other method of separating the latter may be used. The length of fibres should preferably be between 1.5 and 3 mm. with few, if any, fibres of greater length or lesser length and 75% by weight of the material in fibres between 2¼ and 3 mm. length.

Similarly, the cellulose fibre is prepared, cleaned, and separated from excessively short and long fibres until preferably there is little, if any, of the material less than 2½ mm. and substantially not longer than about 5 mm. and 75% from 3¾ to 5 mm. long. The two fibres are then blended, either wet or dry, in the proportion of preferably between 50% and 77% by oven-dry weight of the organic fibre and preferably between 23% and 50% by weight of the inorganic fibre. Different stocks of mineral fibre (preferably asbestos) and different varieties of organic fibre (preferably a mixture of wood fibre and cotton) require a little experience and adjustment of the fibre diameter, lengths and ratios between proportions of organic materials and inorganic materials to get the best results in the intricate felting of the two together and their combined effect in the degerminating of liquids e. g., *B. coli* cultures.

A workable way of felting known to me at present is to flow the mixed pulp on a conveyor belt, which is strongly vibrated transversely to the line of flow before and during the time when that portion of the moisture is removed that changes the pulp from a substantially fluid to a substantially solid web at the time when the felting becomes fixed. This conveyor may be in the form of a continuous band or a series of panels—sieves of wire gauze or other woven material of very fine mesh which is strongly agitated in at least one direction before and during the elimination of excess water from the pulp. Preferably thereafter, the drying of the felted filter beds is done without suction or mechanical compression, merely by external air drying. Thus I believe that the fibres retain the position which they have assumed during the agitation of the water, and that the layer of fibres is gently and uniformly compacted by capillary action retaining a moderately free and uniform porosity. The resulting sheet is, at the same time practically impenetrable to finely dispersed soft or hard solids and is more or less pliable and enabled to accommodate large proportions of material to be removed during filtration.

Cellulose from chemically treated wood pulp may be used, or suitably fine cotton fibre, or other suitably fine and resistant form of cellulose naturally or artificially produced, or even other suitably fibrous organic material that does not give objectionable taste or suffer deterioration from the liquid to be treated. For example, it is practicable to use artificial silk fibre of suitable fineness and length, other similar cellulose materials, and real silk or other nitrogenous fibres for certain purposes, but the latter are more susceptible to the action of high temperatures and should be otherwise sterilized.

While asbestos of suitable fineness and adsorptive quality of fibre is the only reliable mineral fibre known to me at present for making the mineral fibres of my filters, it is probable that other natural and/or artificial fibres will be found or prepared, as from blown furnace slag or the like.

By the use of my filters it is thus possible to commercially treat charged or even charged and viscous liquid products for complete sterilization without the application of heat to the liquid and these filter sheets have made it possible to preserve the natural constituents contributing aroma, flavor and health-giving qualities that it has hitherto been necessary to alter or completely destroy in order to have the liquids be and remain sterile under the conditions of packing, shipment, and storage.

The filter sheets need not, of course, consist entirely of the above described felted fibres. Filter sheets are sometimes held in or between frames, also their edges are provided with stiffening frames, or the sheets themselves are sometimes impregnated with hardening or stiffening material, or formed on or between wire gauze, netting, or other special supports. All these and other usable devices may be applied to my sheets also, provided they are so disposed as not to interfere with the above described effects of fibre selection and felting.

Obviously, such sheets can be united to make, or can be originally formed in various shapes or sections thereof; such as cones, cylinders, tubes and the like, and my invention includes such forms under the generic name of "sheets".

These new and valuable mechanical properties of my filter sheets and the general methods of securing them apply also to the usual preliminary or clarifying filters. As is generally the practice I find it advantageous to use coarsely clarifying filters to remove the large proportion of suspended material from the liquors before passing them to the last and finest of my filters which, unlike former filters, are able to accomplish complete sterilization. These previous filters are ordinarily merely a device to prevent overloading and reducing the capacity of the final filters. In my case however it is peculiarly advantageous to have the degree of clarity of the liquor going to the final filters much greater than has hitherto been used, as my filters are themselves more perfect in their own action. Particularly is this true with respect to completeness of removal of living germs; that is, my clarifying filters are much more valuable if they remove not only the greater portion of the solid matter in general but also the greater portion of the germs. For this reason my claims, whenever not particularly limited, are to be read as covering either the preliminary clarifying and largely degerminating sheets or the final and completely degerminating sheets. For this purpose there may be a considerable variation in the proportion of organic and of inorganic fibers. For example, clarifying filters may have a lesser and lesser proportion of asbestos to produce a more and more free filtration, for which purpose an increasing proportion of cotton to wood fiber may be employed; also, for such purpose, the length of the fibers of either organic or mineral may be increased. However, the strong vibration, preferably in larger part across the direction of the flow of the stream of pulp, is retained in order to insure for the clarifying filters also that intimate felting action which is characteristic of all my new filters, and the general methods of choosing the fiber and forming the final sheet are preserved even though all of them need not be so rigidly restricted. It is even possible, if desired, to regulate the freedom of the liquid being filtered from bacteria by selecting a proper grade of my clearing filters to have the requisite proportion of germs in the liquid effluent to insure its practical stability for a given commercial period and still give it a characteristic "fresh" taste.

It should be clear from the foregoing that these coherently felted combinations of mineral and organic fibres of closely restricted length and proportions, free from adhesives, have the novel characteristics of being able to withstand not only the disrupting action of soft materials being pressed into their pores by the filtering pressure of the liquid, but also the further disrupting action of the gas dissolved therein when it is liberated by the lowered pressure beneath the surface of the sheet. In the preferred form of those coherent filter sheets they can even withstand the greater disrupting action of the expansion of steam in their interstices due to the conditions of steam sterilization and also the peculiar reverse strains incident to back-washing. By disruptive strains, I do not mean of course strains sufficient to tear the filter sheet apart, but those strains of use, which, in the previous filter sheets, were sufficient to render them penetrable by non-sterile matter, and therefore no longer capable of producing practically sterile liquids. In this sense my filters withstand the action of expanding gases liberated from the charged liquids by a fall in pressure of 20 pounds through the filter layers; they may even be made to withstand the effect of direct application of steam pressure 10 to 15 pounds per square inch to sterilize them, and also the action of back-washing with a pressure of about 20 pounds to cleanse and renew the ease of filtering.

While, therefore, I have described as best I can with my entirely new inventions, the best method now known to me of putting them into practice, and the procedure and resulting properties of my product invention, I do not wish to be limited herein to the specific details incident to the description of at least one workable method of carrying out my process and making the commercially successful product, but include the equivalent thereof.

I claim:

1. A filter pad comprising a freely felted coherent intermixture of mineral fiber and organic fiber free from adhesives, in which the organic fiber is proportioned between 50% and 77% by oven-dry weight.

2. A filter pad comprising a freely felted coherent intermixture of mineral fiber and organic fiber free from adhesives, in which the organic fiber is present in a proportion of 50% and 77% by oven-dry weight of the total weight, a substantial proportion of the fibers having a length ranging from 1.5 mm. to 3 mm.

3. A filter pad comprising a freely felted coherent intermixture of mineral fiber and organic fiber free from adhesives, in which the organic fiber is present in a proportion between 50% and 77% by oven-dry weight of the total weight, a substantial proportion of the fibers ranging from 2¼ mm. to 3 mm.

4. A filter pad comprising a freely felted coherent intermixture of mineral fiber and organic fiber free from adhesives, in which the organic fiber is present in the proportion between 50% and 77% by oven-dry weight of the total weight, practically the whole of said fibers having a length less than about 5 mm. and longer than about ¼ mm.

5. A filter sheet comprising a freely felted and very loosely coherent intermixture of asbestos fiber and cellulose fiber, in which the asbestos fiber is present in slightly less than 50%, and in which the cellulose fiber is present in slightly over 50% by weight, the substantial proportion of the fibers being of a length of substantially 2 mm. to 3 mm.

6. The method of purifying a liquid which comprises the step of passing the same through a filter pad consisting of a freely felted coherent intermixture of mineral fiber and organic fiber free from adhesives, in which the organic fiber is proportioned between 50% and 77% by oven-dry weight.

7. The method of purifying a liquid which comprises the step of passing the same through a filter pad consisting of a freely felted coherent intermixture of mineral fiber and organic fiber free from adhesives, in which the organic fiber is present in a proportion of 50% and 77% by oven-dry weight of the total weight, a substantial proportion of the fibers having a length ranging from 1.5 mm. to 3 mm.

GEORGE H. SEITZ.